US008249377B1

(12) United States Patent
Banner et al.

(10) Patent No.: US 8,249,377 B1
(45) Date of Patent: Aug. 21, 2012

(54) BLURRED DIGITAL IMAGE DEBLURRING

(75) Inventors: Ron Banner, Haifa (IL); Carl Staelin, Haifa (IL)

(73) Assignee: Hewlett-Packard Development Company, L.P., Houston, TX (US)

(*) Notice: Subject to any disclaimer, the term of this patent is extended or adjusted under 35 U.S.C. 154(b) by 968 days.

(21) Appl. No.: 12/258,774

(22) Filed: Oct. 27, 2008

Related U.S. Application Data

(60) Provisional application No. 61/059,783, filed on Jun. 8, 2008.

(51) Int. Cl.
*G06K 9/36* (2006.01)
(52) U.S. Cl. .................................. 382/255; 382/266
(58) Field of Classification Search .................. 382/199, 382/255, 261, 263, 266
See application file for complete search history.

(56) References Cited

U.S. PATENT DOCUMENTS

| 6,330,372 | B1* | 12/2001 | Goldstein et al. | 382/266 |
| 2005/0231603 | A1* | 10/2005 | Poon | 348/208.99 |
| 2008/0101716 | A1* | 5/2008 | Ho | 382/266 |
| 2009/0316995 | A1* | 12/2009 | Szeliski et al. | 382/199 |

OTHER PUBLICATIONS

A. Levin et al., "Image and Depth from a Conventional Camera with a Coded Aperture," Procs. of SIGGRAPH, Jul. 2007.
H.-C. Lee, "Review of image-blur models in a photographic system using the principles of optics," Optical Engineering, vol. 29, iss. 5, May 1990.
E. Adelson et al., "Single Lens Stereo with a Plenoptic Camera," IEEE Transactions on Pattern Analysis and Machine Intelligence, vol. 14, No. 2, pp. 99-106 (1992).
P. Axelsson, "Processing of laser scanner data—algorithms and applications," ISPRS Journal of Photogrammetry & Remote Sensing 54 1999.
W. Cathey et al., "New paradigm for imaging systems," Applied Optics vol. 41, No. 29, Oct. 10, 2002.
A. Rajagopalan et al., "Quantitative analysis of error bounds in the recovery of depth from defocused images," J. Opt. Soc. Am. A/ vol. 17, No. 10, Oct. 2000.
E. Dowski, Jr., et al., "Single-lens single-image incoherent passive-ranging systems," Applied Optics / vol. 33, No. 29 / Oct. 10, 1994.
H. Farid, "Range estimation by optical differentiation," Dissertation in Computer and Information Science, Univ. of Pennsylvania, 1997.
P. Favaro et al., "Observing Shape from Defocused Images," International Journal of Computer Vision KL1740-03 Dec. 11, 2002.
E.E. Fenimore, "Coded aperture imaging: predicted performance of uniformly redundant arrays," Applied Optics / vol. 17, No. 22 / Nov. 15, 1978.
R. Fergus et al., "Removing Camera Shake from a Single Photograph," Proceedings of SIGGRAPH, Boston, 2006.
T. Georgeiv et al., "Spatio-Angular Resolution Tradeoff in Integral Photography," Eurographics Symposium on Rendering (2006).
A. Greengard et al., "Depth from diffracted rotation," Jan. 15, 2006 / vol. 31, No. 2 / Optics Letters.

(Continued)

*Primary Examiner* — Andrew W Johns

(57) ABSTRACT

A deblurred digital image is generated from a blurred digital image. The blurred digital image is received. The blurred digital image has a number of objects and a number of edges. Each edge demarcates boundaries of two of the objects. One or more selected edges within the blurred digital image are identified. The selected edges are blurry within the blurred digital image but were originally sharp edges. A blur kernel is determined based on the identified selected edges. The blur kernel denotes how the blurred digital image is blurry. The blur kernel is applied to the blurred digital image to generate the deblurred digital image. The deblurred digital image is output.

15 Claims, 7 Drawing Sheets

OTHER PUBLICATIONS

P. Grossmann, "Depth from focus," Pattern Recognition Letters 5 (1987) 63-69.

S. Hasinoff et al., "Confocal stereo," ECCV (1) 2006: 620-634.

S. Hiura et al., "Depth Measurement by the Multi-Focus Camera," Proceedings of the IEEE Computer Society Conference on Computer Vision and Pattern Recognition, 1998.

D.G. Jones et al., "Analyzing the visual echo," Technical Report: CIM-93-03, 1993.

D. Kundur et al., "Blind image deconvolution," IEEE Signal Processing magazine, May 1996.

S.-H. Lai et al., "A Generalized Depth Estimation Algorithm with a Single Image," IEEE Transactions on Pattern Analysis and Machine Intelligence, Apr. 1992.

A. Levin, "Blind Motion Deblurring Using Image Statistics," Advances in Neural Information Processing Systems (NIPS), Dec. 2006.

M. Levoy et al., "Light Field Microscopy," ACM Transactions on Graphics 25(3), Proceedings of SIGGRAPH 2006.

S. Nayar et al., "Real Tim Focus Range Sensor," IEEE Transactions on vol. 18, Issue 12, Dec. 1996.

R. Ng et al., "Light Field Photography with a Hand-held Plenoptic Camera," Stanford Tech Report CTSR 2005-02, year 2005.

A. Pentland, "A New Sense for Depth of Field," IEEE Transactions on Pattern Analysis and Machine Intelligence, vol. 9, Issue 4 (Jul. 1987).

R. Raskar et al., "Coded Exposure Photography: Motion Deblurring using Fluttered Shutter," Proceedings of SIGGRAPH 2006.

D. Scharstein et al., "A Taxonomy and Evaluation of Dense Two-Frame Stereo Correspondence Algorithms," Int'l Journal of Computer Vision, 47(1/2/3):7-42, Apr.-Jun. 2002.

L. Zhang et al., "Projection Defocus Analysis for Scene Capture and Image Display," ACM Transactions on Graphics, Jul. 2006.

\* cited by examiner

BLURRED DIGITAL IMAGE DEBLURRING

CROSS REFERENCE TO RELATED APPLICATIONS

This Application claims the benefit of provisional patent application Ser. No. 61/059,783, filed Jun. 8, 2008, titled "Blurred Digital Image Deblurring" which application is incorporated by reference herein as if reproduced in full below.

BACKGROUND

Digital cameras have become popular with both home and business users, as they have come down in price, and as users have gained experience with them. A digital camera generally varies from a regular film camera in that instead of taking pictures on film that must be developed, it digitally captures pictures that are saved as digital image files within the camera. As with pictures taken within film cameras, pictures taken with digital cameras can suffer from image corruption, degradation, and/or other problems.

One example of image degradation is blurriness, such as optical blurriness. If a digital picture is captured with a digital camera when the desired subject is out of focus, the resulting picture will be blurry. Existing approaches to deblur a blurred digital picture generally rely on information regarding the imaging system that was employed to capture the deblurred digital picture. However, often this information is not available when a user wishes to deblur a blurred digital picture or other type of blurred digital image.

DETAILED DESCRIPTION

Figure 1:
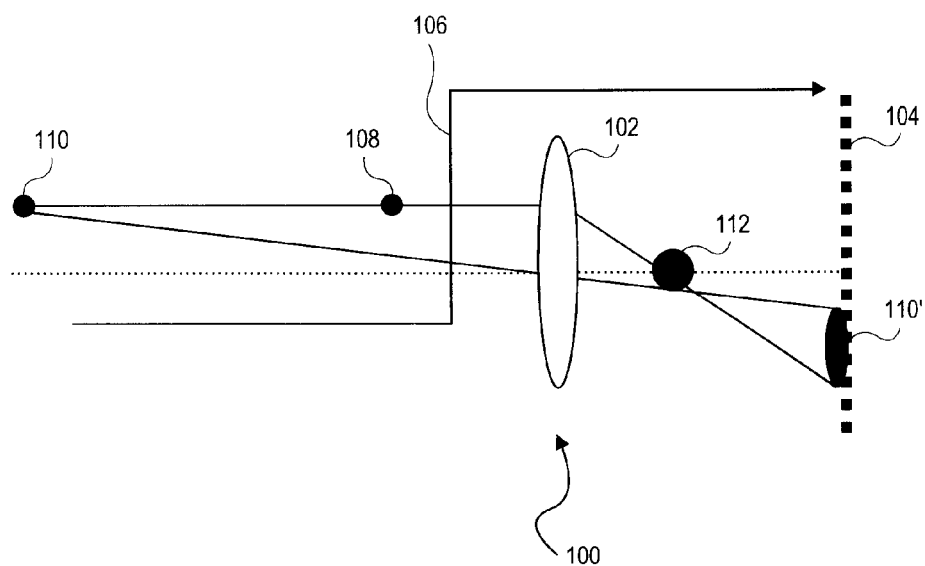
FIG. 1 is a diagram depicting how a digital image can become blurred, in relation to which embodiments of the present disclosure may be practiced.

FIG. 1 shows a digital image can be generated or captured, resulting in the digital image being blurred, in relation to which embodiments of the present disclosure can be practiced. An imaging system 100, such as part of a digital image, that is used to capture a digital image includes a lens 102 and a sensor 104. The sensor 104 results in a corresponding digital image being generated or captured. The imaging system 100 has a focal plane 106.

There are two objects 108 and 110 that are being captured within a digital image by the imaging system 100. The object 108 is in the foreground, whereas the object 110 is in the background. A focal point 112 corresponds to the foreground object 108, in relation to the focal plane 106. As such, the background object 110 is blurry, or blurred, within the digital image captured by the imaging system 100. This is depicted in FIG. 1 by the spot 110' on the sensor 104 and that corresponds to the object 110 being greater in size than the actual object 110 itself.

The type of blurriness depicted in FIG. 1 is referred to as optical blurriness. Optical blurs typically result from problems with depth of field, lens aberration, aperture shutter shape, and aperture speed related to the imaging system 100. A digital image that is blurred due to optical blurriness can be at least substantially deblurred by embodiments of the present disclosure that are described herein.

Figure 2:
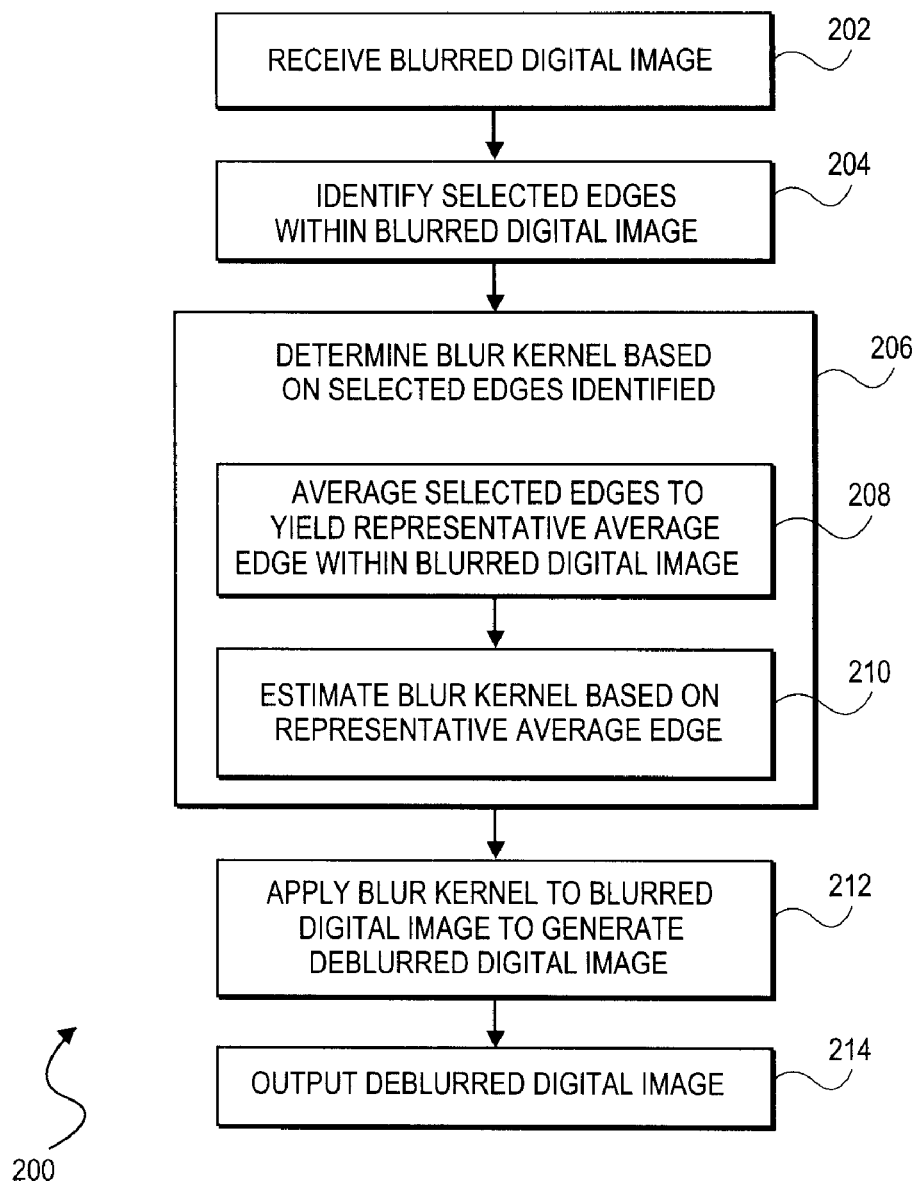
FIG. 2 is a flowchart of a method for deblurring a blurred digital image having at least substantially uniform blurriness, according to an embodiment of the present disclosure.

FIG. 2 shows a method 200 for deblurring a blurred digital image, to generate a corresponding deblurred digital image, according to an embodiment of the present disclosure. A digital image can be considered digital data that represents an image. Such a digital image may be captured by a digital camera, for instance, and stored in a given digital image file format, including but not limited to the JPG and TIF formats, as known within the art.

The method 200 of FIG. 2 particularly presumes that the digital image in question has at least substantially uniform blurriness throughout the digital image, although it can be performed in relation to blurred digital images that do not have at least substantially uniform blurriness. The method 200 may be implemented as one or more computer programs stored on a computer-readable medium. Examples of such computer-readable media include optical, semiconductor, and/or magnetic media.

The blurred digital image is received (202). For instance, the blurred digital image may be captured by a digital camera, or transferred from a computer-readable medium and/or over a network. The digital image is said to include a number of different physical objects represented within the image, as well as a number of edges. The edges demarcate boundaries between the objects. Because the digital image is blurred, these edges are, in particular, blurry.

One or more selected edges are identified within the blurred digital image (204). The selected edges have two qualities. First, the selected edges correspond to edges between objects within the digital image. Second, the selected edges are blurry edges within the digital image, but were originally sharp edges. This can mean, for instance, that if the blurred digital image were not blurry, then the selected edges would in fact be sharp, non-blurry edges, insofar as they represent edges between objects within the image. Such selected edges are in comparison to edges that would be blurry even if the blurred digital image were not blurry, due to the edges not being edges between objects within the image, for example.

In one embodiment, it has been inventively determined that color edges within the blurred digital image correspond to such selected edges. Each such color edge demarcates boundaries between two different colors within the blurred digital image. Thus, locating such color edges can be used to locate the selected edges, because it has been inventively determined that edges between two different colors correspond to edges between different objects within the blurred digital image that should be sharp but that are not within the blurred image. While other, non-color edges may also exist within the blurred digital image that also should be sharp, the presence of the color edges provides one manner by which the selected edges in question can be identified.

Figure 3:
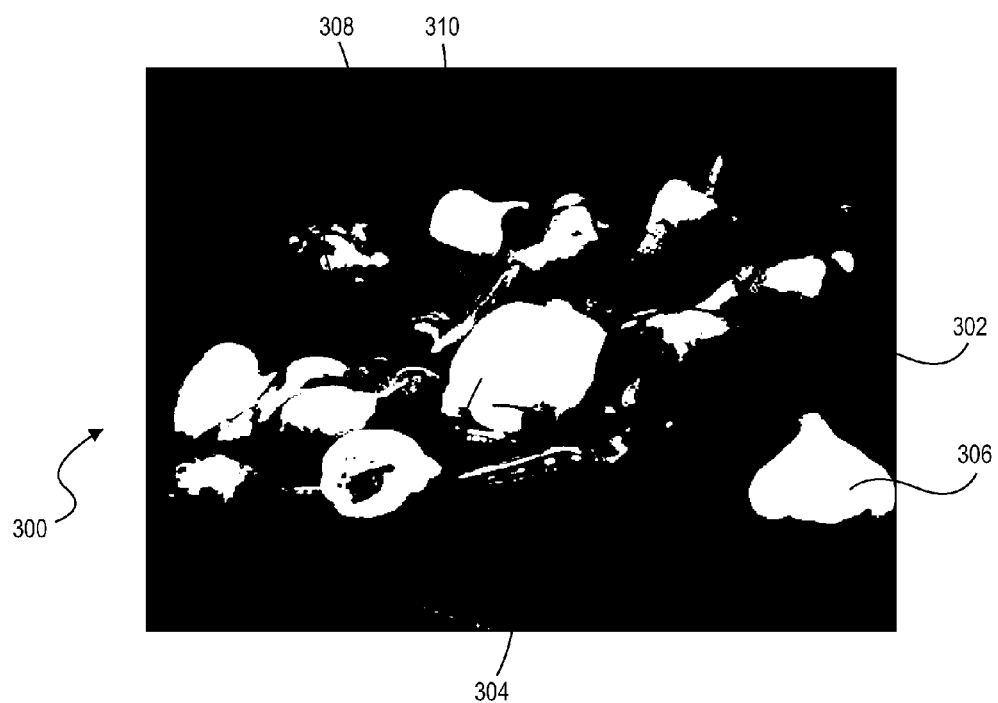
FIG. 3 is a diagram of a representative digital image having different objects with different colors, in relation to which embodiments of the present disclosure can be practiced.

FIG. 3 shows a representative digital image 300 that is depicted to illustrate how color edges can be employed to distinguish between different objects within the digital image 300. It is noted that for illustrative clarity and convenience, the digital image 300 is not blurry. The object 302 has a different color than adjacent objects 304 and 306. As such, the color edge between the color of the object 302 and the color of the object 304 can be identified so as to identify the edge between the objects 302 and 304, which should be sharp because it demarcates two different objects of color. Likewise, the color edge between the color of the object 302 and the color of the object 306 can be identified so as to identify the edge between the objects 302 and 306, which should be sharp because it demarcates two different objects of color.

By comparison, it is noted that objects 308 and 310 are separate objects, but have substantially the same color. Therefore, although there is an edge between the objects 308 and 310 that should be sharp due to its demarcating two different objects, this edge may not be identified as a selected edge, because it does not correspond to a color edge, since the objects 308 and 310 have substantially the same color. However, so long as there are one or more color edges within the digital image 300 that can be identified as corresponding to inter-object edges, it may not matter that there are other inter-object edges that do not have corresponding color edges.

Referring back to FIG. 2, once the selected edges within the blurred digital image have been identified, a blur kernel is determined (206). The blur kernel can be generally considered as denoting how the blurred digital image is blurry. More specifically, within the relationship g=D*f, where f is the deblurred, sharp digital image, g is the blurred digital image, and * is the convolution operator, D is the blur kernel. For a selected edge n, g(n)=D(n)*f(n). It has been inventively determined that D(n)=g(n)–g(n–1), which those of ordinary skill within the art can appreciate permits the blur kernel to be determined and derived from the selected edges that have been identified within the blurred digital image, as is now described in more detail.

Figure 4:
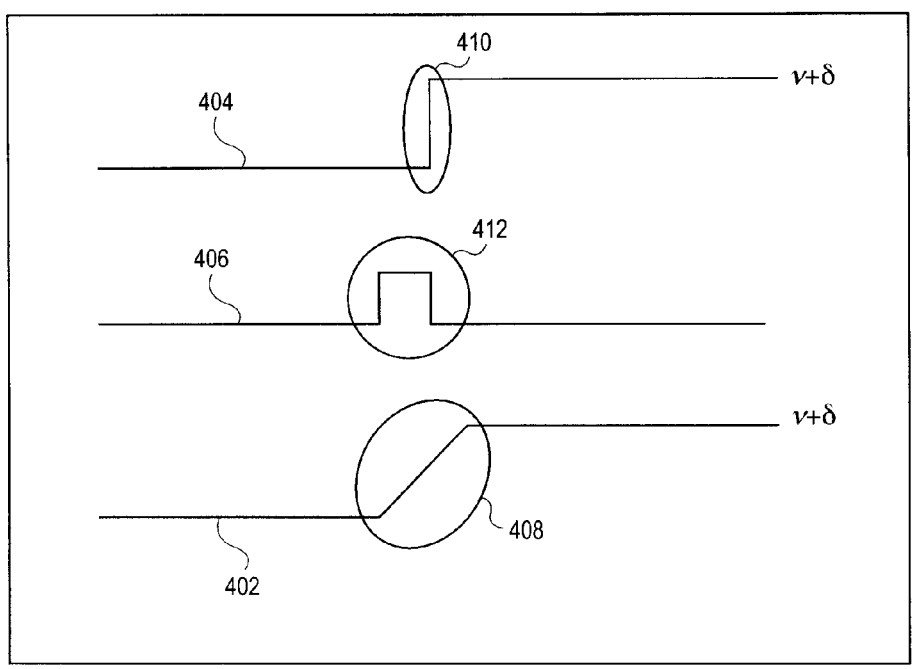
FIG. 4 is a diagram depicting a blur model that is used to generate a blur kernel to deblur a blurred digital image, according to an embodiment of the present disclosure.

FIG. 4 illustratively depicts a blur model 400 representative of the relationship g=D*f, according to an embodiment of the present disclosure. Within the blur model 400, the line 402 represents a one-dimensional transition within the blurred digital image, and the line 404 represents a corresponding one-dimensional sharp transition within the deblurred digital image corresponding to the blurred digital image. The line 406 represents a one-dimensional blur kernel.

There is a one-dimensional sharp transition 410 within the line 404 corresponding to the deblurred digital image, and which is a one-dimensional optimal step. In the blurred digital image, by comparison, the corresponding transition 408 within the line 402 is at an angle, corresponding to the sharp transition within the deblurred, or sharp, digital image having been blurred. This transition 408 particularly results from performing the convolution operation in relation to the sharp transition 410 and a pulse 412 of the blur kernel represented by the line 406. That is, performing the convolution operation on the sharp transition 410 and the pulse 412 results in the transition 408. As can be appreciated by those of ordinary skill within the art, convolution is a mathematical operation that takes a first function and a second function (such as the sharp transition 410 and the pulse 412) and generates a third function (such as the transition 408) that is a modified version of either or both of the first and the second functions. Thus, the deblurred or sharp edge corresponding to a blurred edge within the blurred digital image is modeled as a one-dimensional step via the line 404.

The model 400 thus illustrates that for a given blurred edge, the blur kernel that corresponds to this blurred edge is the derivative of the blurred edge. For example, the line 406 represents the derivative of the line 402. In this way, the blur kernel is determined. Furthermore, because for a selected edge n, g(n)=D(n)*f(n), the sharp, deblurred edge can then be obtained from the blur kernel and the blurred edge. That is, the line 404 can be obtained where the lines 402 and 406 are known or determined.

Referring back to FIG. 2, to achieve robustness, in one embodiment the blur kernel is determined based on the selected edges that have been identified as follows. The selected edges are averaged to yield a representative average edge within the blurred digital image (208). For example, in part 204 edges may have been selected by first convolving each pixel within the image using the kernels [–1, 1] and [1, –1], which yields transition values, or grades, for the pixels, where a larger transition value or grade corresponds to a greater likelihood that a given pixel belongs to an edge. Second, the edges are selected by choosing those pixels having greater transition values, such as transition values greater than a predetermined threshold. These selected edges are then averaged in part 208 by averaging their transition values.

The blur kernel is then estimated based on this representative average edge (210). That is, where it is known that the representative average edge of the blurred digital image corresponds to an optimal sharp transition or edge of the deblurred digital image, the blur kernel is estimated or determined by taking the derivative of the representative average edge. This is because, as has been noted above, D(n)=g(n)–g(n–1), as can be appreciated by those of ordinary skill within the art. In one embodiment, the averaging that is performed can be a weighted averaging. The weight given to each edge can in one embodiment correspond to a likelihood that the edge in question is an edge that was originally sharp prior to having been blurred, as opposed to an edge that was originally blurry.

It is further noted that the method 200 of FIG. 2 presumes at least substantially uniform blurriness throughout the blurred digital image in question. Therefore, the blur kernel can be estimated based on any given selected edge. However, averaging all the selected edges that have been identified to yield a representative average edge, as in part 208, is nevertheless advantageous, since in actuality slight differences between the selected edges may be exist.

Once the blur kernel has been determined, it is applied to each selected edge that has been identified within the blurred digital image to generate a deblurred digital image corresponding to the blurred digital image (212). More generally, the blur kernel is applied to the blurred digital image to generate the deblurred digital image, in accordance with the relationship g=D*f noted above. That is, because the blurred digital image g is known, and the blur kernel D has been determined, the deblurred digital image f can be solved for.

It is noted, therefore, that the deblurred digital image is generated in the method 200 based completely and exclusively on information obtained from the blurred digital image itself. In other words, the generation of the deblurred digital image is not generated based on any external information as to how the blurred digital image was generated, in contradistinction, for instance, to the prior art. Such external information might include information regarding the imaging system that was employed to initially capture the blurred digital image. The method 200 is thus advantageous, because it permits deblurring to be performed even where such external information is unavailable.

The deblurred digital image is ultimately output (214). For instance, the deblurred digital image may be displayed on a display device, or printed on a medium like paper using a printing device. As other examples, the deblurred digital image may be stored on a computer-readable medium, or electronically transmitted, such as over a network like the Internet.

Figure 5:
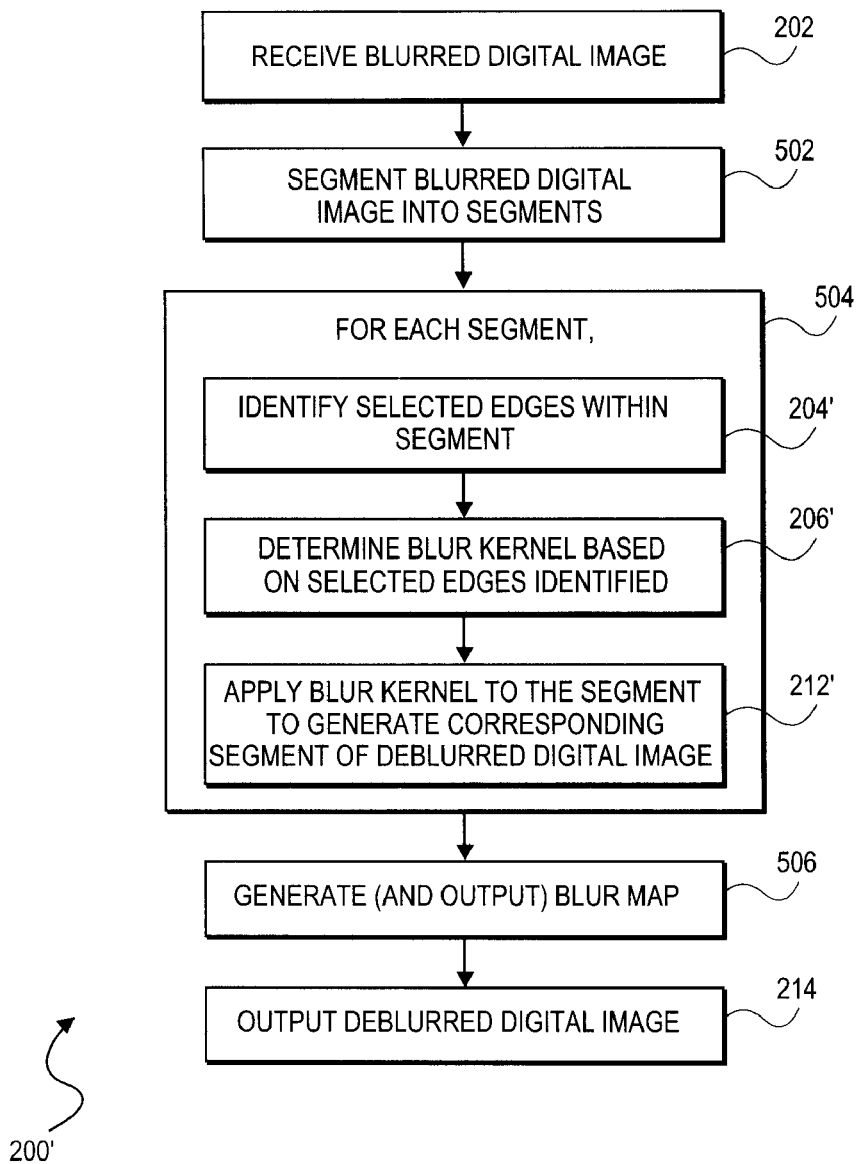
FIG. 5 is a flowchart of a method for deblurring a blurred digital image having non-uniform blurriness, according to an embodiment of the present disclosure.

FIG. 5 shows a method 200' for deblurring a blurred digital image where the blurred digital image does not have at least substantially uniform blurriness throughout, according to an embodiment of the present disclosure. That is, the method 200 as described in relation to FIG. 2 deblurs a blurred digital image that has at least substantially uniform blurriness throughout, by applying the same blur kernel to all the selected edges of the blurred digital image (i.e., by applying the same blur kernel to the entire blurred digital image). By comparison, in relation to FIG. 5, the method 200' is described as deblurring a blurred digital image that does not have at least substantially uniform blurriness throughout. As in the method 200 of FIG. 2, the method 200' in FIG. 5 can be implemented as one or more computer programs stored on a computer-readable medium.

Figures 6A, 6B, 6C, 6D:
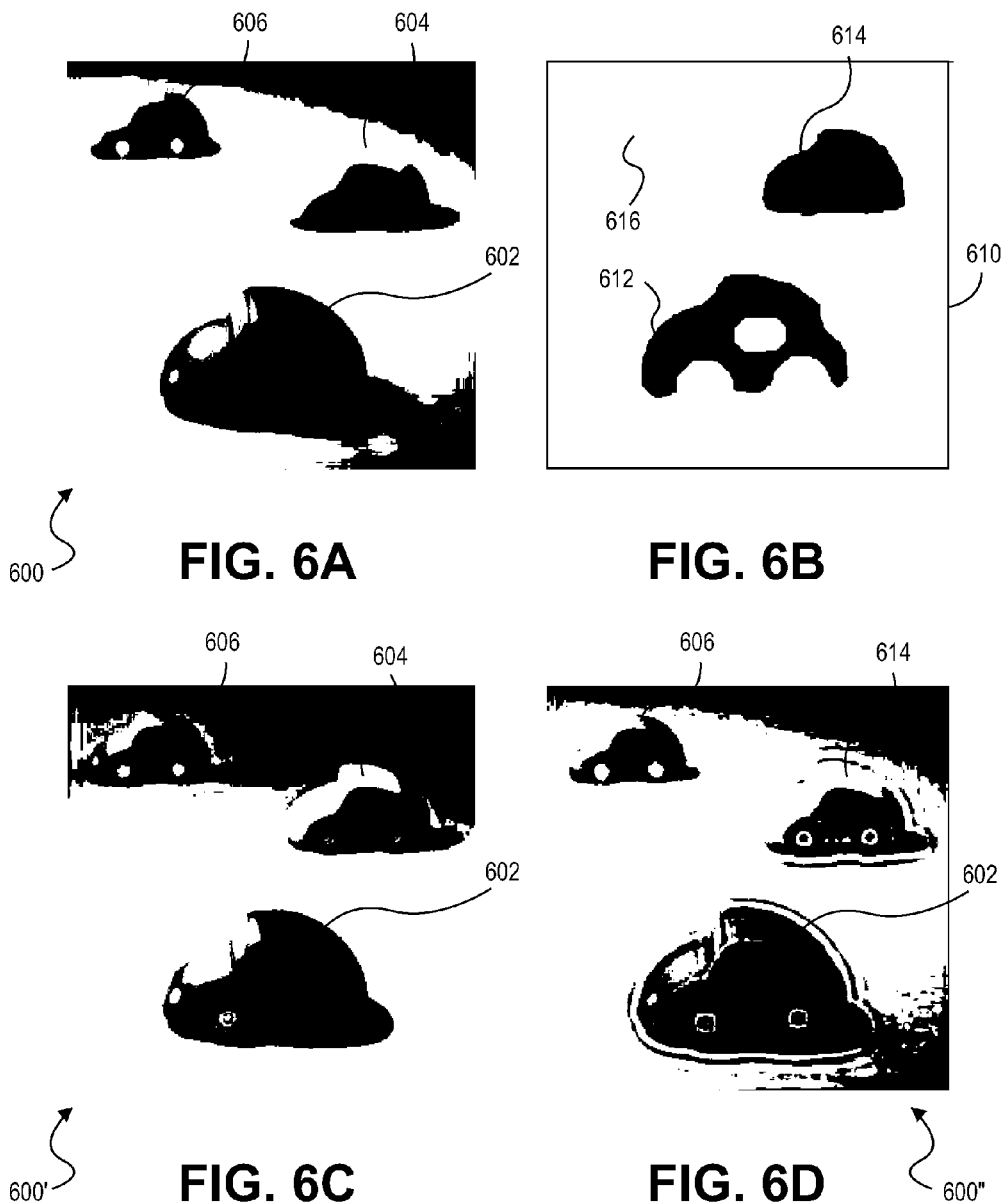
FIG. 6A is a diagram of a representative example blurred digital image, in relation to which embodiments of the present disclosure can be practiced.
FIG. 6B is a diagram of a blur map corresponding to the blurred digital image of FIG. 6A and graphically depicting how a blurred digital image is blurry, according to an embodiment of the present disclosure.
FIG. 6C is a diagram of the blurred digital image of FIG. 6A after deblurring in accordance with the method of FIG. 5, according to an embodiment of the present disclosure.
FIG. 6D is a diagram of blurred digital image of FIG. 6A after deblurring in accordance with the method of FIG. 2, according to an embodiment of the present disclosure.

As before, the blurred digital image is received (202). FIG. 6A shows a representative example blurred digital image 600, in relation to which embodiments of the present disclosure can be practiced. The blurred digital image 600 includes objects 602, 604, and 606. The object 602 is relatively less blurry and the object 606 is relatively more blurry than the object 604 is. Thus, the blurred digital image 600 does not have uniform blurriness throughout.

Referring back to FIG. 5, the blurred digital image is segmented, or partitioned, into a number of segments (502). Each segment has at least substantially uniform blurriness. The uniform blurriness of one segment may be different than the uniform blurriness of another segment. For instance, in FIG. 6A, a segment encompassing each of the objects 602, 604, and 606 would have a different blurriness with respect to each other.

In one embodiment of the present disclosure, a color-based segmentation approach is employed to segment the blurred digital image into segments that each has uniform blurriness. For instance, as can be appreciated by those of ordinary skill within the art, the blurred digital image may be transformed into a different color space, such as the L*a*b color space known within the art. Thereafter, a number of sampled colors can be identified and the Euclidean distance between each pixel of the image and each sampled color is determined. Thereafter, each pixel may be classified based on its closest sampled color. Morphological operations can then be performed to merge regions with the same color that are within the same locational neighborhood, and to remove regions that may be considered too small to have deblurring performed on them.

Thereafter, the following is performed for each segment of the blurred digital image (504). First, selected edges are identified within the segment (204'), as has been described as to part 204 of FIG. 2, but in relation to just the current segment of the blurred digital image, and not in relation to the entire image itself. Likewise, second, a blur kernel is determined for the segment based on these selected edges that have been identified (206'), again as has been described as to part 206 of FIG. 2, but in relation to just the current segment of the blurred digital image, and not in relation to the entire image itself.

The blur kernel that has been determined for the segment is then applied to the selected edges of the segment (i.e., it is applied to the current segment of the blurred digital image) to generate a corresponding segment of a deblurred digital image (212'). Part 212' is performed as has been described as to part 212 of FIG. 2, but in relation to just the current segment of the blurred digital image, and not in relation to the entire image itself. In this way, a different blur kernel is employed for each segment of the blurred digital image, so that deblurring can be achieved differently for each segment of the blurred digital image based on how blurry each segment actually is.

In one embodiment, a blur map may be generated and output (506). A blur map graphically indicates how the blurriness of the segments differ from one another. It is noted that the blur map is generated based completely and exclusively on information from the blurred digital image, and not on any external information regarding how the blurred digital image was generated. FIG. 6B shows an example blur map 610 for the blurred digital image 600 of FIG. 6A, according to an embodiment of the present disclosure. The areas 612, 614, and 616 within the blur map 610 correspond to the objects 602, 604, and 606 of the blurred digital image 600.

The areas 612, 614, and 616 are shaded corresponding to how blurry their corresponding objects 602, 604, and 606 are. Thus, the area 612 is shaded the darkest, corresponding to the object 602 being the least blurry. The area 616 is shaded the lightest, corresponding to the object 606 being the most blurry. The area 614 has a shading that has a darkness between that of the area 612 and that of the area 616, corresponding to the object 604 being less blurry than the object 606 but more blurry than the object 602.

Referring back to FIG. 5, the method 200' concludes by outputting the deblurred digital image that has been generated (214), as in FIG. 2. FIG. 6C shows a representative example deblurred digital image 600' corresponding to the blurred digital image 600 of FIG. 6A that is achieved by performing the method 200' of FIG. 5, according to an embodiment of the present disclosure. The objects 602, 604, and 606 are all substantially less blurry in the deblurred digital image 600' as compared to in the blurred digital image 600.

It is noted that the blur kernels used to deblur the objects 602, 604, and 606 are different, corresponding to the fact that the objects 602, 604, and 606 are located in different segments having different degrees of blurriness. Thus, less deblurring is performed in relation to the object 602 as compared to the deblurring that is performed in relation to the object 604. Similarly, more deblurring is performed in relation to the object 606 as compared to the deblurring that is performed in relation to the object 604.

It is further noted that deblurring a blurred digital image in accordance with the method 200' in the embodiment of FIG. 5 provides for the resulting deblurred digital image having an increased depth of field as compared to the original blurred digital image. This can be seen by comparing the blurred digital image 600 of FIG. 6A to the deblurred digital image 600' of FIG. 6C. The object 602 is closest to the camera lens, while the object 606 is farthest from the camera lens. The depth of field within the blurred digital image 600 is relatively small, insofar as the objects 604 and 606 are more blurry than the object 602 is. By comparison, the depth of field within the deblurred digital image 600' is relatively great, insofar as the objects 604 and 606 are substantially sharp and not blurry, as the object 602 is.

As such, one application of the method 200' in the embodiment of FIG. 5 is to increase the depth of field of a given digital image. The original digital image in this case is referred to as the blurred digital image, and the resulting digital image after processing and having increased depth of field is referred to as the deblurred digital image. Another application of the method 200' in the embodiment of FIG. 5 is to utilize the blur map that may be generated to extract three-dimensional information from a two-dimensional digital image. In particular, the blur map provides depth information as to the objects positioned within the image.

For example, in relation to the example in FIG. 6B, analysis of the blur map 610 shows that the object 602 (having the corresponding area 612 in the map 610) is less far away than the objects 604 and 606 are, and that the object 606 (having the corresponding area 616 in the map 610) is more far away than the objects 602 and 604 are. Such depth information may not be otherwise readily apparent within the blurred digital image 600. Furthermore, such depth information retrieved from the blur map 610 can be employed in conjunction with object-segmentation methodologies to improve the object segmentation achieved by these methodologies, as can be appreciated by those of ordinary skill within the art.

Furthermore, to provide a comparison between the method 200' in FIG. 5 being applied to a blurred digital image having non-uniform blurriness and the method 200 in FIG. 2 being applied to the same digital image, FIG. 6D shows another representative example deblurred digital image 600", according to an embodiment of the present disclosure. The deblurred digital image 600" corresponds to the blurred digital image 600 of FIG. 6A after the performance of the method 200 of FIG. 2. Unlike the deblurred digital image 600' of FIG. 6C, which corresponds to the blurred digital image 600 after the performance of the method 200' of FIG. 5, the deblurred digital image 600" has more artifacts, specifically banding lines, around the objects 602 and 604 in particular. This is because the same blur kernel is used to generate the entire deblurred digital image 600" in FIG. 6D, whereas different blur kernels are used to generate the deblurred digital image 600' in FIG. 6C, based on the different blurriness of the various objects 602, 604, and 606.

Figure 7:
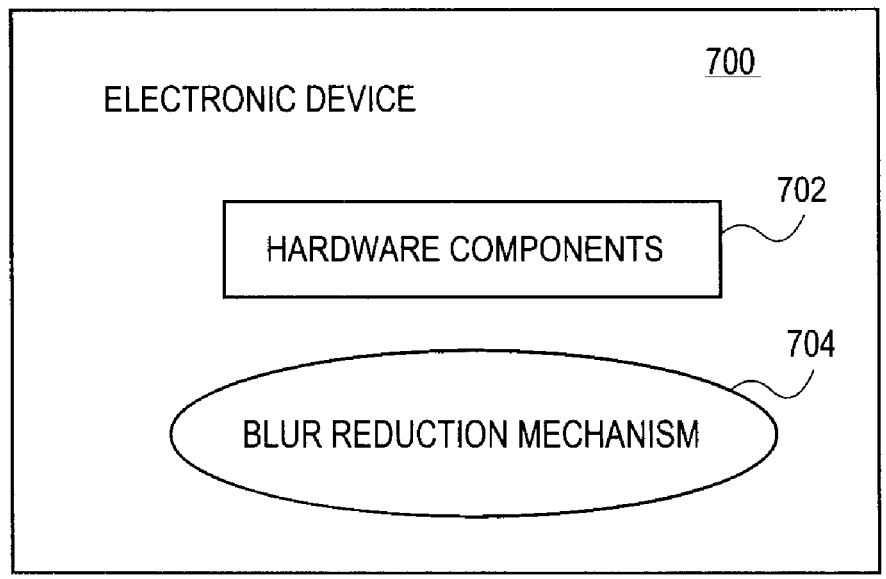
FIG. 7 is a block diagram of a rudimentary electronic device, according to an embodiment of the present disclosure.

In conclusion, FIG. 7 is a block diagram of a rudimentary electronic device 700, according to an embodiment of the present disclosure. The electronic device 700 is depicted as including a number of hardware components 702, and a blur reduction mechanism 704. Those of ordinary skill within the art can appreciate that the electronic device 700 can and typically does include other components and mechanisms, in addition to those depicted in FIG. 7.

The hardware components 702 can include such components as processors, memory, computer-readable media, and other types of hardware components. For instance, where the electronic device 700 is a digital camera, the hardware components 702 may include a digital image capturing mechanism, such as a sensor, lens, and so on. As another example, where the electronic device 700 is a printing device, the hardware components 702 may include a printing mechanism, such as an inkjet-printing mechanism or a laser-printing mechanism. The electronic device 700 may also be a computing device, such as a laptop or a desktop computer, or another type of computing device. In this case, the hardware components 702 may include a general-purpose processor.

The blur reduction mechanism 704 is implemented at least in or via the hardware components 702. For instance, the blur reduction mechanism 704 can in one embodiment include or be software that is executed by and/or from the hardware components 702. The blur reduction mechanism 704 reduces blurring from a blurred digital image, such as in at least some embodiments without employing any external information regarding how the blurred digital image was generated or captured. As such, the blur reduction mechanism 704 may perform the methods 200 and 200' that have been described above in relation to FIGS. 2 and 5, respectively.

In this respect, then, the blur reduction mechanism 704 can be considered a means that is implemented within the hardware components 702 for identifying one or more selected edges within a blurred digital image. The mechanism 704, and thus the means, is also for determining a blur kernel based on the identified selected edges, and for applying the blur kernel to the blurred digital image to generate a deblurred digital image. As has been described, such a blurred digital image has a number of objects and a number of edges, where each edge demarcates boundaries of two of the objects. The selected edges are blurry within the blurred digital image, but were originally sharp edges. The blur kernel denotes how the blurred digital image is blurry.

We claim:

1. A method for generating a deblurred digital image from a blurred digital image, comprising:

receiving the blurred digital image, the blurred digital image having a plurality of objects and a plurality of edges, each edge demarcating boundaries of two of the objects;

identifying one or more selected edges within the blurred digital image, the selected edges being blurry within the blurred digital image and that were originally sharp edges;

determining a blur kernel based on the identified selected edges, the blur kernel denoting how the blurred digital image is blurry, the blur kernel being derived from the identified selected edges;

applying the blur kernel to the blurred digital image to generate the deblurred digital image; and, outputting the deblurred digital image.

2. The method of claim 1, wherein the deblurred digital image is generated based exclusively on information from the blurred digital image, and not on any external information regarding how the blurred digital image was generated.

3. The method of claim 1, wherein identifying the selected edges includes locating one or more color edges within the blurred digital image, each color edge demarcating boundaries between two different colors within the blurred digital image.

4. The method of claim 1, wherein determining the blur kernel based on the identified selected edges comprises:

averaging the selected edges to yield a representative average edge within the blurred digital image; and, estimating the blur kernel based on the representative average edge.

5. The method of claim 1, further comprising:

segmenting the blurred digital image into a plurality of segments, each segment having an at least substantially uniform blurriness within the blurred digital image, such that at least two of the segments have different uniform blurriness, wherein identifying the selected edges, determining the blur kernel, and applying the blur kernel are performed for each segment on a segment-by-segment basis.

6. The method of claim 5, wherein segmenting the blurred digital image into the plurality of segments comprises employing a color-based segmentation approach.

7. The method of claim 5, further comprising:
generating a blur map, the blur map graphically indicating how the uniform blurriness of the segments differ from one another; and,
outputting the blur map.

8. An electronic device comprising:
one or more hardware components; and,
means implemented within the hardware components for identifying one or more selected edges within a blurred digital image, for deriving a blur kernel based on the identified selected edges, and for applying the blur kernel to the blurred digital image to generate a deblurred digital image,
wherein the blurred digital image has a plurality of objects and a plurality of edges, each edge demarcating boundaries of two of the objects,
wherein the selected edges are blurry within the blurred digital image but were originally sharp edges, and
wherein the blur kernel denotes how the blurred digital image is blurry.

9. The electronic device of claim 8, wherein the deblurred digital image is generated based exclusively on information from the blurred digital image, and not on any external information regarding how the blurred digital image was generated.

10. The electronic device of claim 8, wherein the electronic device is one of:
a digital camera and the hardware components comprise a digital image capturing mechanism;
a computing device and the hardware components comprise a general-purpose processor; and,
a printing device and the hardware components comprise a printing mechanism.

11. The electronic device of claim 8, wherein the selected edges are identified by locating one or more color edges within the blurred digital image, each color edge demarcating boundaries between two different colors within the blurred digital image.

12. The electronic device of claim 8, wherein the blur kernel is determined based on the identified selected edges by averaging the selected edges to yield a representative average edge within the blurred digital image, and by estimating the blur kernel based on the representative average edge.

13. The electronic device of claim 8, wherein the means is further for segmenting the blurred digital image into a plurality of segments, each segment having an at least substantially uniform blurriness within the blurred digital image, such that at least two of the segments have different uniform blurriness, and
wherein identifying the selected edges, determining the blur kernel, and applying the blur kernel are performed for each segment on a segment-by-segment basis.

14. A non-transitory computer-readable medium having one or more computer programs stored thereon to perform a method comprising:
receiving a blurred digital image, the blurred digital image having a plurality of objects and a plurality of edges, each edge demarcating boundaries of two of the objects;
segmenting the blurred digital image into a plurality of segments, each segment having an at least substantially uniform blurriness within the blurred digital image, such that at least two of the segments have different uniform blurriness;
for each segment,
identifying one or more selected edges within the segment of the blurred digital image, the selected edges being blurry within the blurred digital image and that were originally sharp edges;
determining a blur kernel based on the identified selected edges, the blur kernel denoting how the segment of the blurred digital image is blurry, the blur kernel being derived from the identified selected edges; and,
applying the blur kernel to the segment of the blurred digital image to generate a corresponding segment of a deblurred digital image.

15. The non-transitory computer-readable medium of claim 14, wherein the deblurred digital image is generated based exclusively on information from the blurred digital image, and not on any external information regarding how the blurred digital image was generated.

* * * * *